UNITED STATES PATENT OFFICE.

WILLIAM A. LAWRENCE, OF JAMAICA, NEW YORK, N. Y., ASSIGNOR TO INTERCONTINENTAL RUBBER COMPANY, OF JERSEY CITY, NEW JERSEY, A CORPORATION OF NEW JERSEY.

ART OF REFINING RUBBER.

1,058,186.

Specification of Letters Patent.

Patented Apr. 8, 1913.

No Drawing.

Application filed July 3, 1911. Serial No. 636,662.

*To all whom it may concern:*

Be it known that I, WILLIAM A. LAWRENCE, a citizen of the United States, residing at No. 87 Shelton avenue, Jamaica, borough of Queens, city and State of New York, have invented certain new and useful Improvements in the Art of Refining Rubber; and I do hereby declare the following to be a full, clear, and exact description of the invention, such as will enable others skilled in the art to which it appertains to make and use the same.

My invention relates to certain new and useful improvements in the art of refining crude rubber, and consists in bringing into intimate physical contact and potential chemical combination with the rubber the distillate obtained by the destructive distillation of wood in the presence of an alkaline solution, as for instance, sodium hydrate, which is the alkali I preferably employ. The mutual interaction of the distillate, the rubber and the alkaline solution effect an improvement of the rubber distinctly greater than if the alkaline solution were omitted, rendering the rubber more nervy, more tough, more elastic, more stable, and less "tacky."

The novelty of my present invention consists, therefore, principally in the fact, which I believe myself the first to discover, that by properly subjecting rubber, as hereinafter described, to the action of an alkaline reagent in solution in the presence of a solution comprising substantially the distillate obtained from the destructive distillation of wood, a beneficial effect upon the rubber is produced of a quality distinctly greater than in case either solution is applied to the rubber without the other.

In carrying out my invention, I prefer for purposes of economy and convenience to use substantially the "whole distillate"—including the tar, when its percentage is so small (say 5 per cent.) as to be mechanically and commercially negligible as to use and value, and excluding it when it is mechanically objectionable or commercially valuable. I may say, however, that it is, of course, readily conceivable that, at the sacrifice or partial sacrifice of the commercial advantage of using the cheap unfractionated distillate, some other of its inert or substantially inert constituents than tar may be removed or even that the constituents furnishing the active principle may be synthetically combined to furnish a suitable substitute therefor. For this reason, it will likewise be understood that in specifying the employment of the whole distillate I do so without the intent of depriving myself of the advantage of the employment of equivalents, or of the right to remove or omit neutral constituents.

I will describe the employment of my invention to the treatment of three different grades or conditions of rubber, that is to say (1) rubber already extracted from the wood, bark, or latex of rubber-producing plants, (2) rubber not yet extracted from its vegetable sources, as for instance, rubber to be mechanically abstracted, by rubbing and pressure, from comminuted plants, roots, barks, rhizomes and the like, and (3) rubber contained in the latex of rubber-producing trees, vines or other sources. In practice, the process varies in some particulars for each of these three conditions of the rubber when the distillate alone is used. So also, when together with the distillate, an alkaline solution is employed as in the present invention, there are further preferred variations, required by the addition of the alkaline solution, as will appear more fully from the following description.

1. In case I am operating on rubber already extracted from the wood, bark, or latex of rubber-producing plants, I first comminute the rubber into small particles, preferably by "crêping" between rolls set as close together as is practicable. I then place this rubber in a suitable vessel, preferably a steam-jacketed kettle with a cover capable of being closed and bolted at the top and tested to withstand not less than 80 lbs. steam pressure to the square inch, with suitable appliances for the admission and control of steam and water for charging and discharging. Into this kettle I place, for example, a charge of 450 lbs. of the comminuted rubber, and to treat this quantity of rubber I use preferably an upright cylindrical kettle four feet in diameter and seven feet in depth. I then preferably bring forty-five pounds of 76° Bé. sodium hydrate into solution with 264 gallons of cold water, making a two per cent. alkaline solution, and run this solution in upon the charge of rubber already in the kettle, and then run into the kettle two gallons of the wood distillate, distilled preferably from the green and fresh cut wood of *Pinus rigida*. I then promptly close and bolt down the cover, hermetically sealing it by a suitable gasket, and I admit steam to the steam jacket bringing the pressure on the contents of the kettle up to preferably forty pounds by the gage, and hold it there preferably for one hour thereafter. At the end of one hour, I find, in practice, that an active principle of the distillate, assisted by the heat and pressure in the presence of the aqueous alkaline solution above described, has permeated mechanically and combined chemically with the solution and the rubber and has thereby produced the desired effect of increasing the "nerve," elasticity, toughness and stability of the rubber, and at the same time decreasing its previously objectionable resinous content and stickiness to an extent tangibly greater than is the case where the alkaline solution is omitted and all other features of the process retained and carried out. At the end of the one hour's boil above mentioned, I prefer in practice to draw off the charge, preferably through a valved pipe not less than six inches in diameter, and preferably into a beater washer suitably placed to receive the charge by gravity, in which beater washer by active maceration and agitation for preferably half an hour in the presence of water preferably hot, the rubber is practically cleared of the alkaline solution and of any detachable impurities existing in the original material, and is then ready to be skimmed off, sheeted out and dried in the ordinary manner.

It should be here stated that I have found by repeated experiments that the active principle of the distillate to which my invention by the aid of the added alkaline solution is indebted for its efficacy and usefulness, is readily volatile at 100° C. or 212° Fahr. and for this reason I use a closed kettle, independent of the fact that the heat and pressure are also accessory to the chemical action of the distillate and the alkaline solution upon the rubber.

2. In case I am operating on rubber not yet extracted from its vegetable sources as, for instance, on comminuted plants, roots, barks, rhizomes, etc., containing rubber, I find that during the process of extracting the rubber by the mechanical means of rubbing and pressure, whatever means are used of sufficient force to extract the rubber, are also, when the distillate by itself alone (i. e. without the addition of alkali) is applied during the process of extraction in the presence of water, of sufficient mechanical force to thoroughly mix and bring the distillate into intimate contact with the rubber so that no heat and pressure is required as in the case of rubber already extracted. It is necessary simply to add the distillate to the water used in the process of extraction at the beginning of that process, adding, however, double the proportion of distillate in proportion to the rubber present, as formulated in the heat and pressure process above described, to make up for any distillate rendered inoperative by the presence of the woody matter of the raw unextracted material, and at the end of the process of extraction I find the rubber decidedly improved in quality by the intimate contact of the distillate with the rubber accomplished by the mechanical means of rubbing and pressure while in the presence of water. But I also find, in accordance with my present invention, that if I add at the beginning of the extractive operation an alkaline solution to the charge of un-extracted rubber material, water, and distillate already in the extractor, I obtain an additional chemical reaction which results in a decided improvement in the rubber over and above the improvement resulting from the use of the distillate without the presence of the alkaline solution. In my present process, therefore, I add preferably sodium hydrate to the water used in the mechanical process of extraction in the proportion of one pound of about 76° Baumé commercial sodium hydrate to each ten pounds of rubber contained in the charge under extraction. The large quantity of water required in the extraction of rubber from its vegetable sources by mechanical means (except in the treatment of latex) amply provides sufficient water to bring the sodium hydrate into proper solution, and the maceration and agitation of the process of extraction produces an intimate and prolonged contact of the alkaline solution with the rubber, so that at the end of the extractive process the desired combination or inter-action of the distillate and the alkaline solution with the rubber is complete, and the further treatment of the rubber is carried out in the ordinary manner.

3. In case I am operating on the rubber contained in the latex of rubber-producing trees, vines or other sources, I find this material specially amenable to the action of chemical reagents by reason of the fact that the particles of rubber existing in emulsion in the latex are exceedingly small and mobile in the semi-liquid latex, and, therefore, under the influence of the active principles of certain substances readily form a new arrangement of molecules (polymerization) by which transposition the physical properties of the rubber are changed without changing its chemical composition. In operating on rubber latex, therefore, for the purpose of bringing to bear upon the rubber the polymerizing action of the distillate obtained by the destructive distillation of wood combined with an alkaline solution, it is only necessary to bear in mind the normal percentage of rubber in the particular sort of latex to be treated, which percentage is already and practically well known to the operator by his previous operative results in weight of rubber from a given weight of latex. I then proceed to carry out my invention, in its application to latex, by first stirring into and thoroughly mixing with the semi-liquid latex in the preferred proportion of 25 c. c.—or about one-fifth of a gill—of the distillate to each pound of dry rubber pertaining to the latex under treatment. The chemical composition of the distillate obtained by the destructive distillation of wood renders it necessarily a valuable assistant to the coagulation of the latex as well as an agent in the improvement of the rubber, but a still further improvement in the rubber is inevitable if a preferred and proper alkaline solution is added promptly in succession to the application of the distillate to the latex; the combination of the distillate and the alkaline solution producing a decidedly increased improvement of the rubber over and above the effect of either reagent applied without the other as noted above in the case of rubber already extracted, but with an added advantage over that, owing to the fact that in the latex the rubber is held in emulsion in very minute and plastic particles, peculiarly amenable to chemical reagents and resulting polymeric transposition. This preferred alkaline solution I find in a five per cent. aqueous solution of sodium hydrate (NaOH). I prefer it for this purpose to potassium hydrate (KOH) or to any other alkaline reagent known to me, because in my experience I have found its effect upon rubber to be at least as good as any other alkali, and its cost in extensive operations considerably less. Promptly following the application of the distillate to the latex I add, therefore, and thoroughly stir and mix in, a preferred five per cent. aqueous solution of sodium hydrate in the proportion of one pound of sodium hydrate, contained in the five per cent. solution, to twenty pounds of rubber present in the latex, the rubber figured as "bone dry." The rubber is then ready, within half an hour, to be separated from the watery portion of the latex by any of the ordinary methods,—boiling, drying and smoking over palm-nut fire, open-air evaporation in flat pans, or by mechanical means, as, for instance by my own "cone" process (U. S. patent dated May 24th, 1904, #760,459), or by any other method which may be found best adapted to the particular variety of latex under treatment.

I have now described various methods and forms of apparatus by which the distillate obtained from the destructive distillation of wood in combination with an alkaline solution, may be applied to crude rubber in such manner that any one skilled in the arts may carry out my invention successfully. But I do not limit myself specifically to any of these methods or forms of apparatus, as will be apparent from the foregoing description and from the appended claims.

Having thus described my invention what I claim is:

1. The method of improving rubber, which consists in subjecting it to the action of an alkaline reagent in solution, in the presence of the distillate obtained by the destructive distillation of woody matter; substantially as described.

2. The method of improving rubber, which consists in subjecting it to the action of caustic alkali in solution, in the presence of the distillate obtained by the destructive distillation of woody matter; substantially as described.

3. The method of improving rubber, which consists in subjecting it to the action of sodium hydrate in solution, in the presence of the distillate obtained by the destructive distillation of woody matter; substantially as described.

4. The method of improving rubber, which consists in bringing it into intimate physical contact and potential chemical combination with an alkaline reagent in solution, in the presence of the constituents, active with the alkaline reagent in the production of the results set forth, of the distillate obtained by the destructive distillation of woody matter; substantially as described.

5. The method of improving rubber, which consists in bringing it into intimate physical contact and potential chemical combination with caustic alkali in solution, in the presence of the constituents, active with the caustic alkali in the production of the results set forth, of the distillate obtained by the destructive distillation of woody matter; substantially as described.

6. The method of improving rubber, which consists in bringing it into intimate physical contact and potential chemical combination with sodium hydrate in solution, in the presence of the constituents, active with the sodium hydrate in the production of the results set forth, of the distillate obtained by the destructive distillation of woody matter; substantially as described.

In testimony whereof I affix my signature, in presence of two witnesses.

WILLIAM A. LAWRENCE.

Witnesses:
H. K. GRANDIN,
JOHN C. PENNIE.